US012573782B1

(12) United States Patent
Wang

(10) Patent No.: US 12,573,782 B1
(45) Date of Patent: Mar. 10, 2026

(54) PIN COMBINED STRUCTURE FOR POWER CONVERTER WITH MORE COMPACT VOLUME

(71) Applicant: GUANGDONG WORLDPLUG TECHNOLOGY CO., LTD, Huizhou City (CN)

(72) Inventor: Feng Wang, Huizhou City (CN)

(73) Assignee: GUANGDONG WORLDPLUG TECHNOLOGY CO., LTD, Huizhou City (CN)

( * ) Notice: Subject to any disclaimer, the term of this patent is extended or adjusted under 35 U.S.C. 154(b) by 0 days.

(21) Appl. No.: 19/256,551

(22) Filed: Jul. 1, 2025

(30) Foreign Application Priority Data

Jan. 24, 2025 (CN) ......................... 202520171952.3
Mar. 4, 2025 (CN) ......................... 202510247967.8

(51) Int. Cl.

| | |
|---|---|
| ***H01R 31/06*** | (2006.01) |
| ***H01R 13/04*** | (2006.01) |
| ***H01R 13/35*** | (2006.01) |
| ***H01R 13/44*** | (2006.01) |
| ***H01R 13/502*** | (2006.01) |
| ***H01R 13/66*** | (2006.01) |

(52) U.S. Cl.
CPC ............. *H01R 13/35* (2013.01); *H01R 13/04* (2013.01); *H01R 13/44* (2013.01); *H01R 13/502* (2013.01); *H01R 13/6675* (2013.01); *H01R 31/065* (2013.01)

(58) Field of Classification Search
CPC ........ H01R 13/35; H01R 13/04; H01R 13/44; H01R 13/502; H01R 13/6675; H01R 31/065
See application file for complete search history.

(56) References Cited

U.S. PATENT DOCUMENTS

| | | | | |
|---|---|---|---|---|
| 7,445,513 | B1 * | 11/2008 | Lee | H01R 31/06 439/652 |
| 8,734,168 | B2 * | 5/2014 | Lee | H01R 31/06 439/95 |
| 9,831,622 | B1 * | 11/2017 | Lin | H01R 29/00 |
| 2014/0145689 | A1 * | 5/2014 | Carlucci | H01R 31/06 439/639 |
| 2015/0099380 | A1 * | 4/2015 | Ruffner | H01R 13/4534 439/137 |
| 2018/0212383 | A1 * | 7/2018 | Liao | H01R 24/78 |
| 2019/0312395 | A1 * | 10/2019 | Barnett | H01R 31/06 |
| 2019/0341731 | A1 * | 11/2019 | Barnett | H01R 13/46 |
| 2020/0192408 | A1 * | 6/2020 | Chien | G05F 1/45 |
| 2021/0376546 | A1 * | 12/2021 | Barnett | H01R 27/00 |
| 2022/0077640 | A1 * | 3/2022 | Frei | H01R 27/00 |
| 2024/0072502 | A1 * | 2/2024 | Chin | H01R 24/38 |
| 2025/0192485 | A1 * | 6/2025 | Zeng | H01R 35/04 |

* cited by examiner

*Primary Examiner* — Abdullah A Riyami
*Assistant Examiner* — Nelson R. Burgos-Guntin
(74) *Attorney, Agent, or Firm* — Cooper Legal Group LLC

(57) ABSTRACT

The present invention discloses a pin combined structure for a power converter with a more compact volume, The present invention overlaps the space occupied by the American standard pin assembly, the European standard pin assembly and the British standard pin assembly, reduces the overall length of the power converter, reduces the overall volume of the power converter, and is more convenient for a user to carry on a trip.

14 Claims, 12 Drawing Sheets

PIN COMBINED STRUCTURE FOR POWER CONVERTER WITH MORE COMPACT VOLUME

CROSS-REFERENCE TO RELATED APPLICATIONS

The application claims priority of Chinese patent application 202510247967.8, filed on Mar. 4, 2025, and Chinese patent application 202520171952.3, filed on Jan. 24, 2025. Chinese patent application 202510247967.8 and Chinese patent application 202520171952.3 are incorporated herein by reference in their entireties.

TECHNICAL FIELD

The present invention relates to the field of power converters and, more particularly, to a pin combined structure for a power converter with a more compact volume.

BACKGROUND ART

Due to different specifications of plug and socket in different countries, they are not universal. If it is necessary to insert the plug into the socket with mismatched specifications, it is necessary to have a power converter. The power converter is a converting tool that is used by inserting the power converter into a target socket and then inserting a target plug into a mating socket hole in the power converter to effect converting. The advent of power converters has increased the ease with which people can live outside, especially when traveling across the country, without worrying about the inconvenience of having a portable electronic device with a plug that does not fit into a local power socket.

In conventional power converters, the pins are typically in a fixed, extended state. However, for a power converter including a plurality of pins, it is necessary to provide the plurality of pins, and to separate the pins from each other, so as to prevent the plurality of pins from interfering with each other in use. However, such a separate arrangement results in an overall bulky power converter, which is inconvenient to be carried on a trip and affects the experience of use.

SUMMARY OF THE INVENTION

In view of the above-mentioned deficiencies, it is an object of the present invention to provide a pin combined structure for a power converter with a more compact volume, which overlaps the space occupied by the American standard pin assembly, the European standard pin assembly and the British standard pin assembly, reduces the overall length of the power converter, reduces the overall volume of the power converter, and is more convenient for a user to carry on a trip.

The technical solution adopted by the present invention to achieve the above-mentioned object is as follows.

A pin assembly structure for a power converter with a more compact volume includes an American standard pin assembly and a British standard pin assembly provided in the power converter; the British standard pin assembly includes a British standard shared slider slidingly provided in the power converter, and a British standard ground wire pin provided on the British standard shared slider; the British standard shared slider is integrally U-shaped, and an avoidance space is formed therein; the American standard pin assembly includes an American standard shared slider provided in the avoidance space, the American standard shared slider is formed with a British standard ground wire avoidance groove which is inwardly recessed and matched with a British standard ground wire pin, and the British standard ground wire pin moves along the British standard ground wire avoidance groove; it also includes a European standard pin assembly provided in the avoidance space; and the European standard pin assembly includes a European standard shared slider slidingly provided within the avoidance space, a European standard live wire pin provided on the European standard shared slider, and a European standard neutral wire pin provided on the European standard shared slider.

As a further improvement of this embodiment, the European standard pin assembly further includes a European standard live wire conducting strip provided on the European standard shared slider, protruding outwards and electrically connected to the European standard live wire pin, and a European standard neutral outwards and electrically connected to the European standard neutral wire pin; the British standard shared slider is formed with an inwardly recessed European standard conducting strip avoidance groove, which allows the European standard live wire conducting strip and the European standard neutral wire conducting strip to move when driven by the European standard shared slider.

As a further improvement of this embodiment, a British standard pin operating rod protruding outside the power converter is provided on the British standard shared slider; an American standard pin operating rod protruding outside the power converter is provided on the American standard shared slider; and a European standard pin operating rod protruding outside the power converter is provided on the European standard shared slider; and the British standard pin operating rod, the American standard pin operating rod and the European standard pin operating rod are provided alternately.

As a further improvement of this embodiment, the initial height of the European standard pin operating rod is higher than the initial height of the British standard pin operating rod and the American standard pin operating rod.

As a further improvement of this embodiment, it further includes a socket live wire conducting clip provided in the power converter and a socket neutral wire conducting clip provided in the power converter, wherein the socket live wire conducting clip is formed with a European standard live wire conductive avoidance groove which is folded upwards in a ⊓ shape and provides a yield for the European standard pin assembly; and the socket neutral wire conducting clip is formed with a European standard neutral wire conductive avoidance groove which is folded upwards in a ⊓ shape and provides a yield for the European standard pin assembly.

As a further improvement of this embodiment, the socket live wire conducting clip further includes a live wire conduction clip provided at both ends of the European standard live wire conductive avoidance groove and for the insertion of an external plug; and the socket neutral wire conducting clip further includes a neutral wire conduction clip provided at both ends of the European standard neutral wire conductive avoidance groove and for the insertion of an external plug.

As a further improvement of this embodiment, it further includes a safety member provided in the power converter; a British standard safety avoidance portion that is recessed in an avoidance space direction and that yields the safety member is formed on the British standard shared slider.

A pin assembly structure for a power converter with a more compact volume includes an American standard pin assembly and a British standard pin assembly provided in the power converter; the British standard pin assembly includes a British standard shared slider slidingly provided in the power converter, and a British standard ground wire pin provided on the British standard shared slider; the British standard shared slider is integrally U-shaped, an avoidance space is formed therein, and the British standard ground wire pin is located on the outside of the avoidance space; and the American standard pin assembly includes an American standard shared slider provided in the avoidance space, the American standard shared slider is formed with a British standard ground wire avoidance groove which is inwardly recessed and matched with a British standard ground wire pin, and the British standard ground wire pin moves along the British standard ground wire avoidance groove.

As a further improvement of this embodiment, there is also included a European standard pin assembly provided in the avoidance space; the European standard pin assembly includes a European standard shared slider slidably provided in the avoidance space, a European standard live wire pin provided on the European standard shared slider, and a European standard neutral wire pin provided on the European standard shared slider.

As a further improvement of this embodiment, the European standard pin assembly further includes a European standard live wire conducting strip provided on the European standard shared slider, protruding outwards and electrically connected to the European standard live wire pin, and a European standard neutral outwards and electrically connected to the European standard neutral wire pin; the British standard shared slider is formed with an inwardly recessed European standard conducting strip avoidance groove, which allows the European standard live wire conducting strip and the European standard neutral wire conducting strip to move when driven by the European standard shared slider.

As a further improvement of this embodiment, a British standard pin operating rod protruding outside the power converter is provided on the British standard shared slider; an American standard pin operating rod protruding outside the power converter is provided on the American standard shared slider; and a European standard pin operating rod protruding outside the power converter is provided on the European standard shared slider; and the British standard pin operating rod, the American standard pin operating rod and the European standard pin operating rod are provided alternately.

As a further improvement of this embodiment, the initial height of the European standard pin operating rod is higher than the initial height of the British standard pin operating rod and the American standard pin operating rod.

As a further improvement of this embodiment, it further includes a socket live wire conducting clip provided in the power converter and a socket neutral wire conducting clip provided in the power converter, wherein the socket live wire conducting clip is formed with a European standard live wire conductive avoidance groove which is folded upwards in a ⊓ shape and provides a yield for the European standard pin assembly; and the socket neutral wire conducting clip is formed with a European standard neutral wire conductive avoidance groove which is folded upwards in a ⊓ shape and provides a yield for the European standard pin assembly.

As a further improvement of this embodiment, the socket live wire conducting clip further includes a live wire conduction clip provided at both ends of the European standard live wire conductive avoidance groove and for the insertion of an external plug; and the socket neutral wire conducting clip further includes a neutral wire conduction clip provided at both ends of the European standard neutral wire conductive avoidance groove and for the insertion of an external plug.

As a further improvement of this embodiment, it further includes a safety member provided in the power converter; a British standard safety avoidance portion that is recessed in an avoidance space direction and that yields the safety member is formed on the British standard shared slider.

The invention has the following beneficial effects.

(1) Embodiment 1: by arranging the present power converter pin assembly structure to include an American standard pin assembly and a British standard pin assembly provided in the power converter. The British standard pin assembly includes a British standard shared slider slidingly provided in the power converter, and a British standard ground wire pin provided on the British standard shared slider; the British standard shared slider is integrally U-shaped, and an avoidance space is formed therein; the American standard pin assembly includes an American standard shared slider provided in the avoidance space; the American standard shared slider is formed with a British standard ground wire avoidance groove which is inwardly recessed and matched with the British standard ground wire pin; and the British standard ground wire pin moves along the British standard ground wire avoidance groove. By arranging the American standard pin assembly in the avoidance space to slide and moving the British standard ground wire pin along the British standard ground wire avoidance groove, the space occupied by the American standard pin assembly coincides with the space occupied by the British standard pin assembly, so that the overall length of the power converter is reduced. The overall size of the power converter is reduced, and it is more convenient for users to carry.

(2) By providing a European standard pin assembly in the power converter, the European standard pin assembly includes a European standard shared sliderd slidably provided in the avoidance space and movable in the avoidance space, a European standard live wire pin provided on the European standard shared slider, and a European standard neutral wire pin provided on the European standard shared slider. The European standard pin assembly is movable in the avoidance space, so that the space occupied by the European standard pin assembly. Thus, the space occupied by the American standard pin assembly and the space occupied by the American standard pin assembly coincide, reducing the overall length of the power converter and reducing the overall volume of the power converter, which is more convenient for the user to carry it on the trip.

(3) By providing a British standard pin operating rod protruding outside the power converter is provided on the British standard shared slider; an American standard pin operating rod protruding outside the power converter is provided on the American standard shared slider; and a European standard pin operating rod protruding outside the power converter is provided on the European standard shared slider; and the British standard pin operating rod, the American standard pin operating rod and the European standard pin operating rod are provided alternately, and the alternate configuration thereof facilitates a user to select different pin assemblies for use, effectively avoiding a case where a plurality of operating rods are pressed once.

(4) Embodiment 2: by arranging the present power converter pin assembly structure to include an American standard pin assembly and a British standard pin assembly provided in the power converter. The British standard pin assembly includes a British standard shared slider slidingly provided in the power converter, and a British standard ground wire pin provided on the British standard shared slider; the British standard shared slider is integrally U-shaped, and British standard ground wire pin is located outside the avoidance space; the American standard pin assembly includes an American standard shared slider provided outside the avoidance space; the American standard shared slider is formed with a British standard ground wire avoidance groove which is inwardly recessed and matched with the British standard ground wire pin; and the British standard ground wire pin moves along the British standard ground wire avoidance groove. By arranging the American standard pin assembly outside the avoidance space to slide and moving the British standard ground wire pin along the British standard ground wire avoidance groove, the space occupied by the American standard pin assembly coincides with the space occupied by the British standard pin assembly, so that the overall length of the power converter is reduced. The overall size of the power converter is reduced, and it is more convenient for users to carry.

The above is an overview of the technical solutions of the invention, and the invention is further explained in combination with the accompanying drawings and the detailed description.

Figure 1:
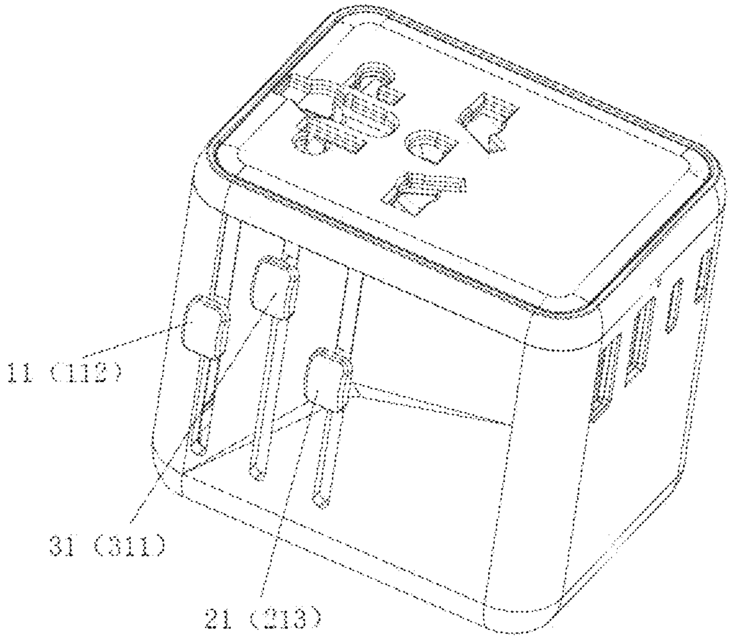
FIG. 1 is an overall schematic view of a power converter according to Embodiment 1.

In the drawings, 1, American standard pin assembly; 11, American standard shared slider; 111, British standard ground wire avoidance groove; 112, American standard pin operating rod; 12, American standard live wire pin; 13, American standard neutral wire pin; 2, British standard pin assembly; 21, British standard shared slider; 211, avoidance space; 212, European standard conducting strip avoidance groove; 213, British standard pin operating rod; 214, British standard safety avoidance portion; 22, British standard ground wire pin; 23, British standard live wire pin; 24, British standard neutral wire pin; 3, European standard pin assembly; 31, European standard shared slider; 311, European standard pin operating rod; 32, European standard live wire pin; 33, European standard neutral wire pin; 34, European standard live wire conducting strip; 35, European standard neutral wire conducting strip; 4, socket live wire conducting clip; 41, European standard live wire conductive avoidance groove; 42, live wire conduction clip; 5, socket neutral wire conducting clip; 51, European standard neutral wire conductive avoidance groove; 52, neutral wire conduction clip; 6, safety member.

DETAILED DESCRIPTION

In order to further clarify the technical means and effects adopted by the present invention to achieve the intended purpose, a detailed description of specific embodiments of the present invention will be given below with reference to the accompanying drawings and preferred embodiments.

In the description of the present invention, it should be understood that the directional or positional relationships indicated by the terms "length", "width", "up", "down", "front", "back", "left", "right" and "vertical", "level", "top", "bottom", "inside", "outside", "side" and the like are based on the directional or positional relationships shown in the drawings. It is merely for the purpose of describing the present application and simplifying the description, and is not intended to indicate or imply that a particular orientation, configuration and operation of the referenced device or element is required and should not be construed as limiting the scope of the present invention.

Furthermore, the terms "first" and "second" are used for descriptive purposes only and are not to be construed as indicating or implying relative importance or implicitly indicating the number of technical features indicated. Thus, a feature defined by "first" and "second" and so on may explicitly or implicitly include one or more such features. In the description of the present invention, the meaning of "a plurality" is two or more, unless specifically limited otherwise.

In the present invention, unless expressly stated or limited otherwise, the terms "mounted", "connected", "connecting", "fixed", and the like are to be interpreted broadly, e.g., either fixedly or removably, or integrally modularization. It may be a mechanical connection or an electrical connection. It may be a direct connection or indirect connection by an intermediary. It may be a communication between two elements, or may be in an interactive relationship between two elements. For those of ordinary skill in the art, the specific meanings of the above terms in the present invention can be understood according to specific circumstances.

Embodiment 1

Referring to FIGS. 1 to 12, an embodiment of the present invention provides a pin assembly structure for a power converter with a more compact volume, including an American standard pin assembly 1 and a British standard pin assembly 2 provided in the power converter. The British standard pin assembly 2 includes a British standard shared slider 21 slidably provided in the power converter, and a British standard ground wire pin 22 provided on the British standard shared slider 21; the British standard shared slider 21 is integrally U-shaped, and an avoidance space 211 is formed therein; the American standard pin assembly 1 includes an American standard shared slider 11 provided in the power converter and slidably provided in the avoidance space 211, the American standard shared slider 11 is formed with a British standard ground wire avoidance groove 111 recessed inwards and matched with the British standard ground wire pin 22; and the British standard ground wire pin 22 moves along the first British standard ground wire avoidance groove 111. By arranging the American standard pin assembly 1 in the avoidance space 211 to slide, the space occupied by the American standard pin assembly 1 coincides with the space occupied by the British standard pin assembly 2, and the British standard ground wire pin 22 moves linearly along the British standard ground wire avoidance groove 111, the occupied space between the British standard ground wire pin 22 and the American standard pin assembly 1 is further saved, the overall length of the power converter is reduced, and the overall volume of the power converter is reduced. It is more convenient for a user to carry on the trip.

Preferably, in order to make the power converter more practical, as shown in FIGS. 2 to 3, 5, 6 and 8, the pin assembly structure of the power converter further includes a European standard pin assembly 3 provided in the power converter and slidably provided in the avoidance space 211. The European standard pin assembly 3 includes a European standard shared slider 31 provided in the power converter and slidably provided in the avoidance space 211, a European standard live wire pin 32 provided on the European standard shared slider 31, and a European standard neutral wire pin 33 provided on the European standard shared slider 31. By providing a European standard pin assembly 3 in the power converter, the selectivity of the pins which can be selected for use is further improved, and the practicality of the power converter is improved, which is beneficial to people's travel. When people need to use the European standard pin assembly 3, it is only necessary to push out the European standard shared slider 31 towards the outside of the power converter. Thus, the European standard live wire pin 32 and the European standard neutral wire pin 33 are pushed out of the power converter, so as to realize the conversion of the European standard pin. The European standard pin assembly 3 moves in the avoidance space 211, so that the space occupied by the European standard pin assembly 3, the space occupied by the American standard pin assembly 1 and the space occupied by the British standard pin assembly 2 coincide, thereby reducing the overall length of the power converter and reducing the overall volume of the power converter, which is more convenient for the user to carry it on the trip.

With regard to the specific method for electrically connecting the European standard pin assembly 3 with the power converter, as shown in FIGS. 1-6 and 8, the European standard pin assembly 3 further includes a European standard live wire conducting strip 34 provided on the European standard shared slider 31, protruding outwards and electrically connected to the European standard live wire pin 32, and a European standard neutral wire conducting strip 35 provided on the European standard shared slider 31, protruding outwards and electrically connected to the European standard neutral wire pin 33. When the European standard shared slider 31 drives the European standard live wire pin 32 and the European standard neutral wire pin 33 to be pushed out, the European standard live wire conducting strip 34 and the European standard neutral wire conducting strip 35 which are provided in the European standard shared slider 31 follow and move synchronously, so that the European live wire conducting strip 34 and the European standard neutral wire conducting strip 35 are inserted into a conduction mechanism in the power converter to realize a conduction and current connection between the European standard pin assembly 3 and the power converter. The whole process is conducted stably, and the conduction efficiency is improved.

Preferably, as shown in FIGS. 2-3, 5, 6 and 8, in order to further save space in the power converter and facilitate the pushing out and use of the European standard pin assembly 3, the European standard shared slider 21 is formed with a European standard conducting strip avoidance groove 212 which is recessed to one end away from the avoidance space 211 and allows the European standard live wire conducting strip 34 and the European standard neutral wire conducting strip 35 to move linearly when driven by the European standard shared slider 31, and the European standard live wire conducting strip 34 and the European standard neutral wire conducting strip 35 move up and down in the European standard conducting strip avoidance groove 212. Thus, the space occupied by the European standard live wire conducting strip 34 and the European standard neutral wire conducting strip 35 coincides with the space occupied by the European standard shared slider 21, further saving the space in the power converter, reducing the overall length of the power converter, reducing the overall volume of the power converter. It is more convenient for a user to carry the product, and facilitates the pushing out and use of the European standard pin assembly 3.

Figure 6:
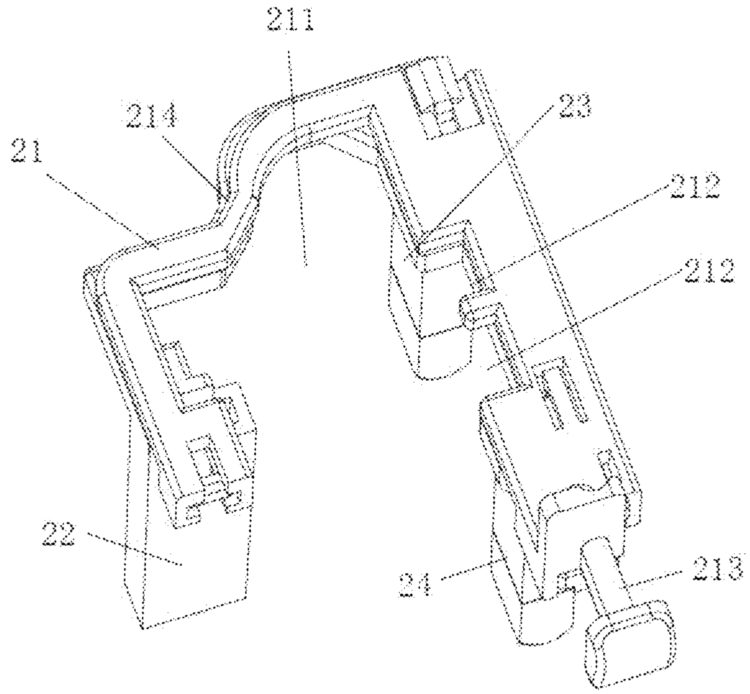
FIG. 6 is a structurally schematic view of the British standard pin assembly according to Embodiment 1.

With regard to other structural arrangements of the British standard pin assembly 2, as shown in FIG. 6, the British standard ground wire pin 22 is provided on one end of the U-shaped structure of the British standard shared slider 21; and the British standard pin assembly 2 further includes a British standard neutral wire pin 24 provided on a side of the other end of the U-shaped structure of the British standard shared slider 21, and a British standard live wire pin 23 provided on the other side of the other end of the U-shaped structure of the British standard shared slider 21.

Figure 7:
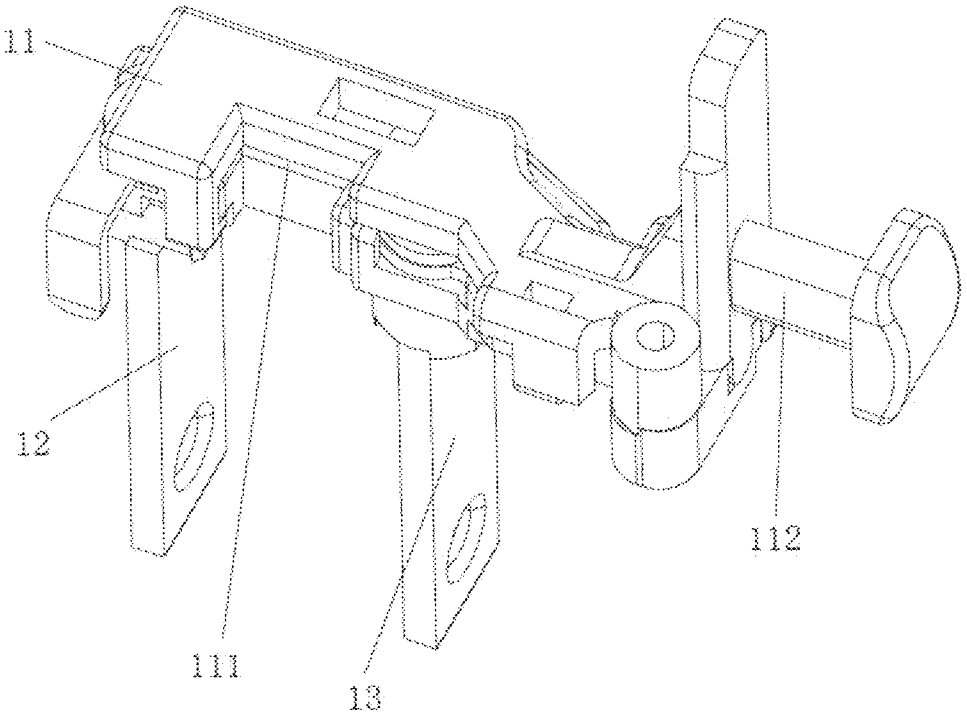
FIG. 7 is a structurally schematic view of the American standard pin assembly according to Embodiment 1.

With regard to other structural arrangements of the American standard pin assembly 1, as shown in FIG. 7, the American standard pin assembly 1 further includes an American standard live wire pin 12 provided on the American standard shared slider 11 and an American standard neutral wire pin 13 provided on the American standard shared slider 11, wherein the American standard live wire pin 12 and the American standard neutral wire pin 13 are located on both sides of the British standard ground wire pin 22, so as to make the space occupied by the American standard pin assembly 1 and the British standard pin assembly 2 coincide, reducing the overall length of the power converter, reducing the overall volume of the power converter, which is more convenient for a user to carry it on a trip.

For the specific way of pushing the British standard pin assembly 2 out of the power converter, as shown in FIG. 6, the British standard pin operating rod 213 protruding outside the power converter is provided on the British standard shared slider 21. A user pushes the British standard pin operating rod 213 to push out the British standard shared slider 21 and structures such as a British standard live wire pin 23, a British standard neutral wire pin 24 and a British standard ground wire pin 22 provided on the British standard shared slider 21 from the power converter, which is simple and convenient to use.

For the specific way of pushing the American standard pin assembly 1 out of the power converter, as shown in FIG. 7, the American standard pin operating rod 112 protruding outside the power converter is provided on the American standard shared slider 11. A user pushes the American standard pin operating rod 112 to push out the American standard shared slider 11 and structures such as an American standard live wire pin 12 and an American standard ground wire pin 13 provided on the American standard shared slider 11 from the power converter, which is simple and convenient to use.

Figure 8:
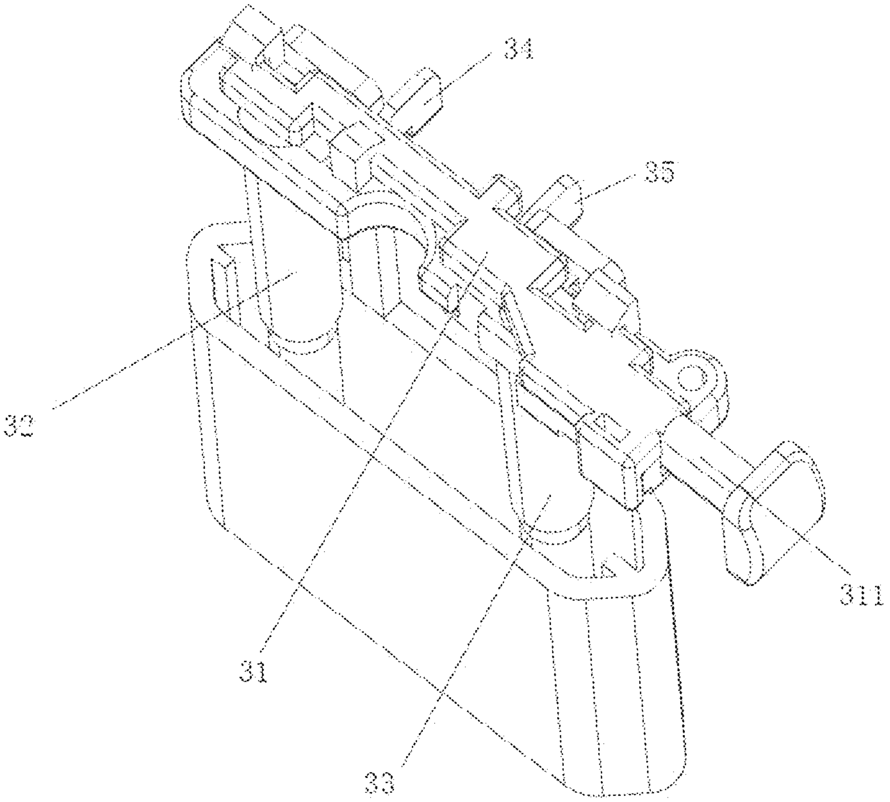
FIG. 8 is a structurally schematic view of the European standard pin assembly according to Embodiment 1.

For the specific way of pushing the European standard pin assembly 3 out of the power converter, as shown in FIG. 8, the European standard pin operating rod 311 protruding outside the power converter is provided on the European standard shared slider 31. A user pushes the European standard pin operating rod 311 to push out the European standard shared slider 31 and structures such as a European standard live wire pin 32 and a European standard neutral wire pin 33 provided on the European standard shared slider 31 from the power converter, which is simple and convenient to use.

Figure 2:
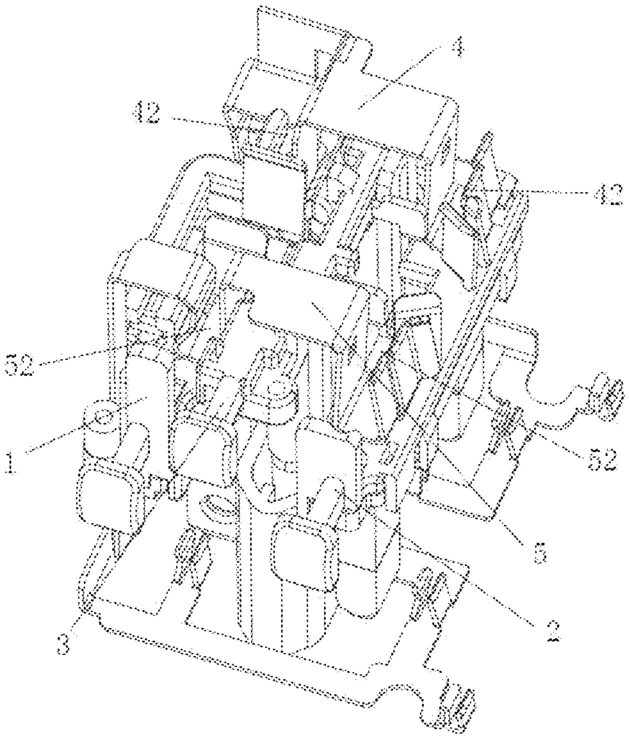
FIG. 2 is a schematic view showing an internal structure of the power converter according to Embodiment 1.
Figure 3:
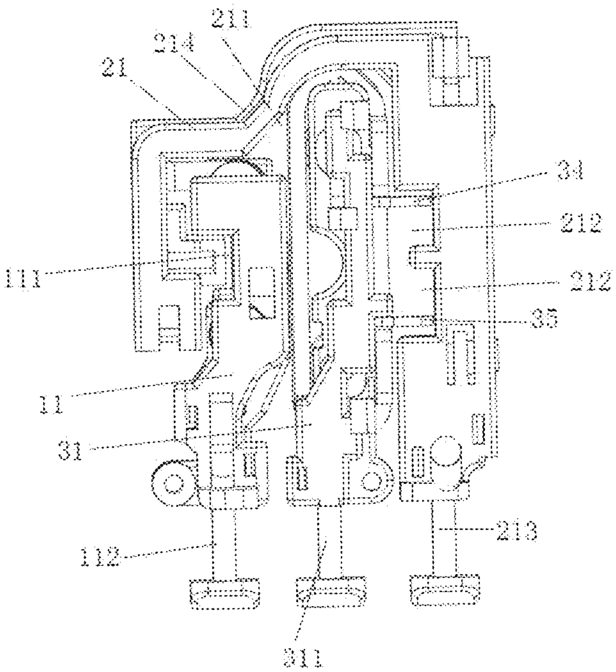
FIG. 3 is a structurally schematic view of an American standard pin assembly, a British standard pin assembly, and a European standard pin assembly according to Embodiment 1.
Figure 4:
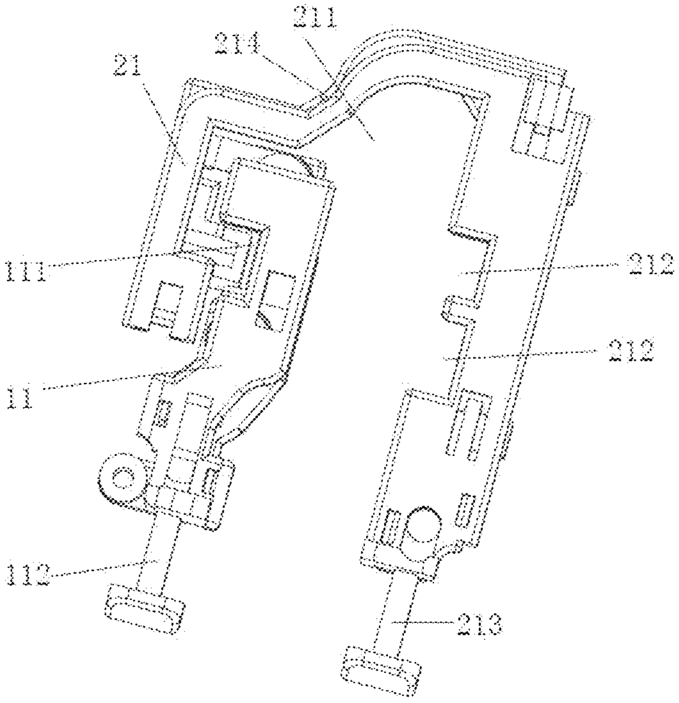
FIG. 4 is a structurally schematic view of the British standard pin assembly and the American standard pin assembly according to Embodiment 1.
Figure 5:
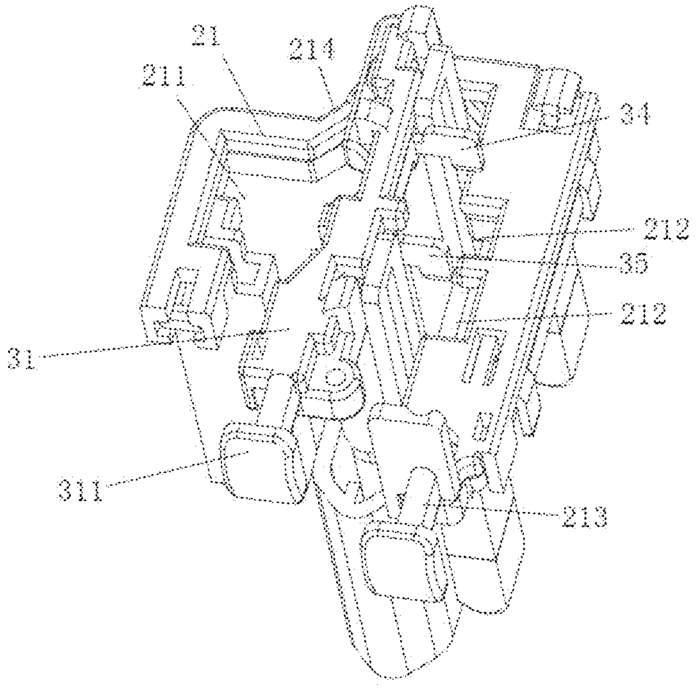
FIG. 5 is a structurally schematic view of the British standard pin assembly and the European standard pin assembly according to Embodiment 1.

In order to allow the user to more accurately select different prong assemblies, as shown in FIGS. 1 to 2, the British standard pin operating rod 213, the American standard pin operating rod 112 and the European standard pin operating rod 311 are staggered, and the staggered configuration facilitates the user's selection of different pin assemblies for use, effectively avoiding a case where a plurality of operating rods are pressed at once.

Preferably, as shown in FIGS. 1 to 2, the initial height of the European standard pin operating rod 311 is higher than the initial height of the British standard pin operating rod 213 and the American standard pin operating rod 112, thereby forming a staggered arrangement, effectively avoiding a case where a plurality of operating rods are pressed at once.

Figure 9:
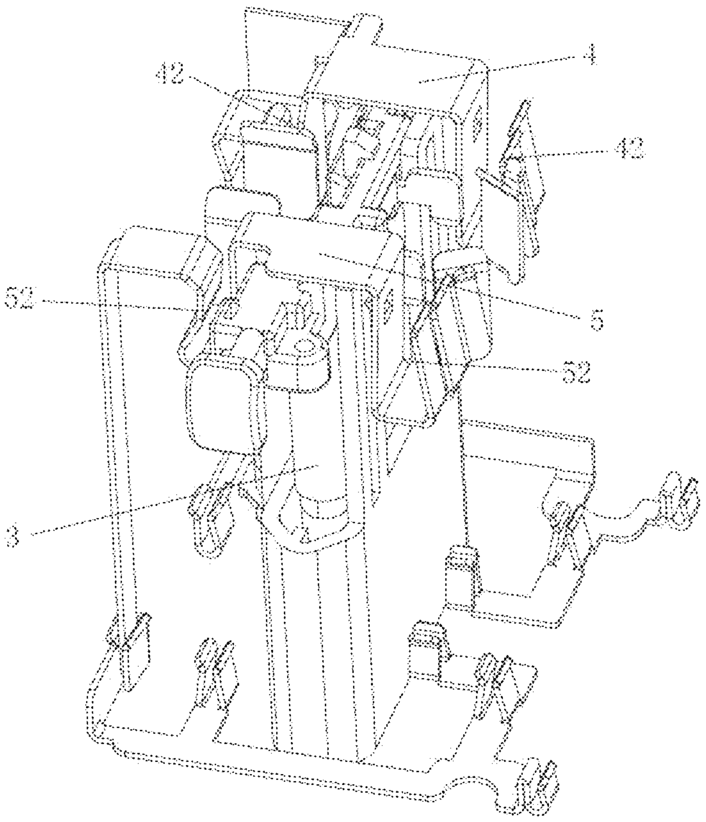
FIG. 9 is a structurally schematic view of the European standard pin assembly, a socket live wire conducting clip and a socket neutral wire conducting clip according to Embodiment 1.
Figure 10:
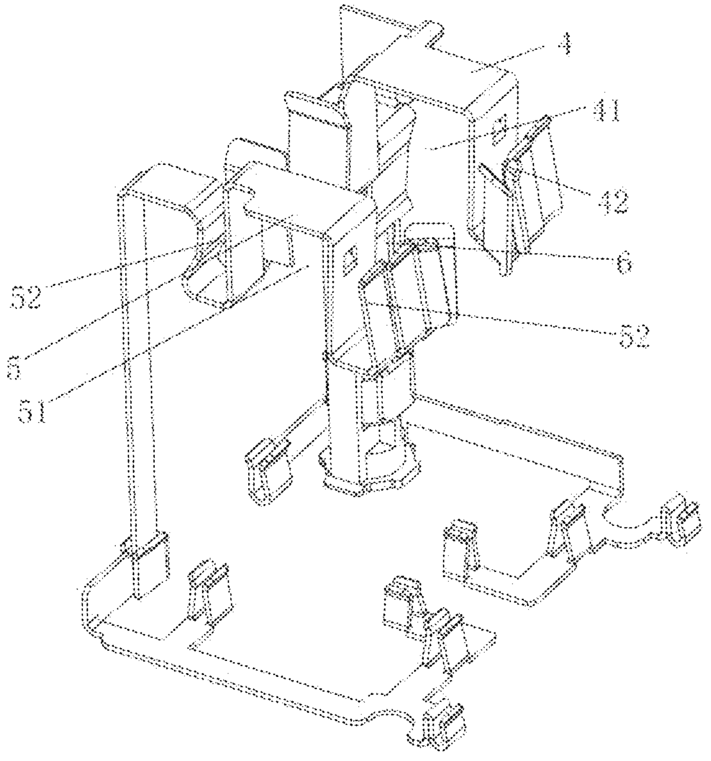
FIG. 10 is a structurally schematic view of the socket live wire conducting clip and the socket neutral wire conducting clip according to Embodiment 1.
Figure 11:
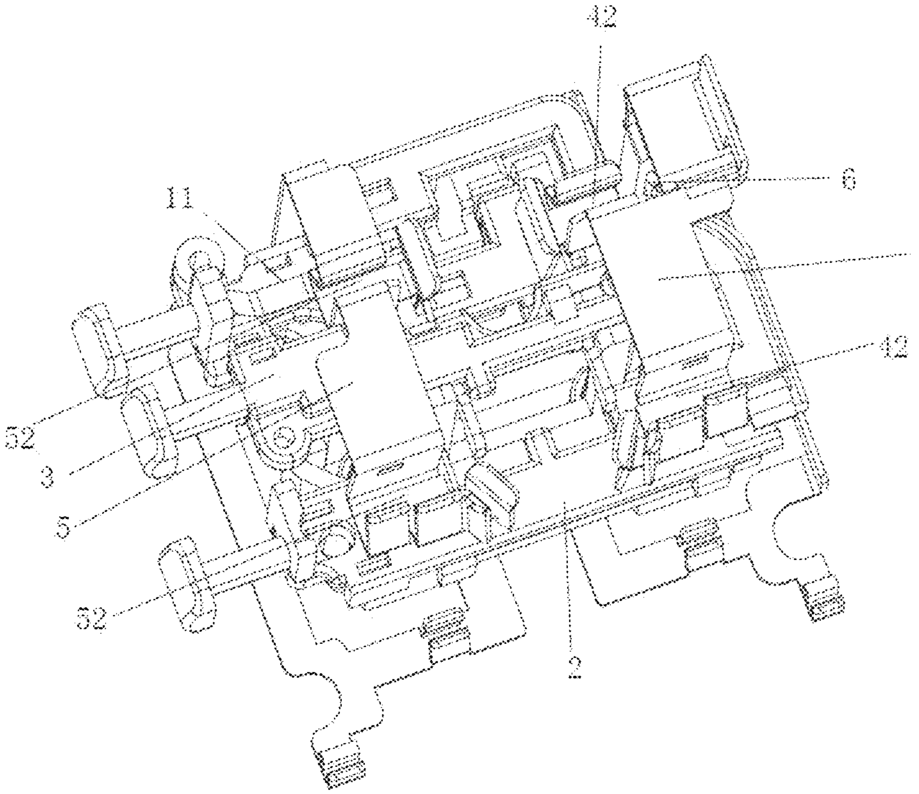
FIG. 11 is a plan view of the socket live wire conducting clip and the socket neutral wire conducting clip according to Embodiment 1.
Figure 12:
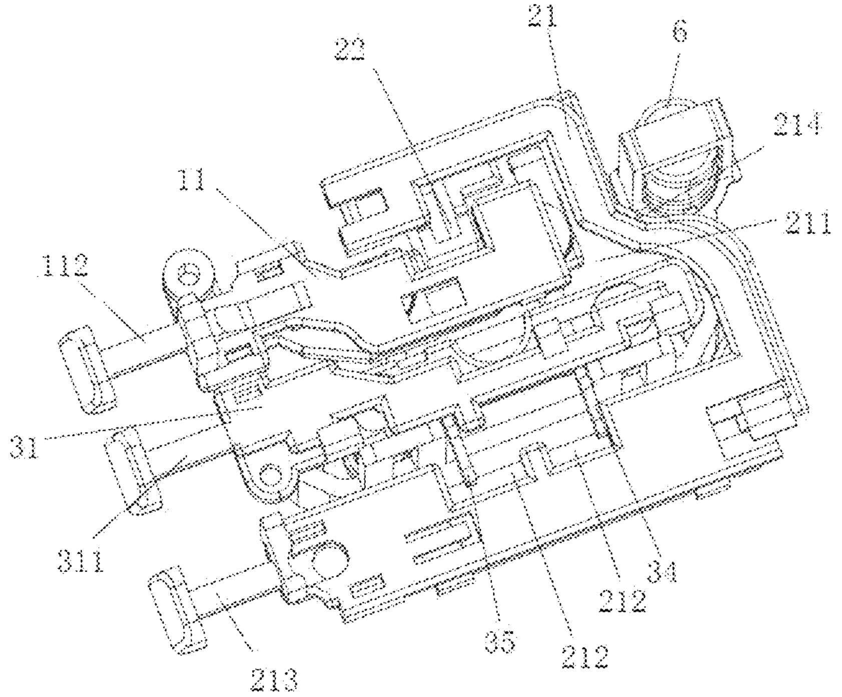
FIG. 12 is a structurally schematic view of the American standard pin assembly, the British standard pin assembly, the European standard pin assembly, and a safety member according to Embodiment 1.

With regard to the arrangement of the conduction structure in the power converter, as shown in FIGS. 2 and 9-10, the pin combined structure of the power converter further includes a socket live wire conducting clip 4 provided in the power converter and a socket neutral wire conducting clip 5 provided in the power converter. When the British standard pin assembly 2 is pushed out for use, the British standard live wire conducting strip provided on the British standard shared slider 21 is inserted into the socket live wire conducting clip 4, and the British standard neutral wire conducting strip provided on the British standard shared slider 21 is inserted into the socket neutral wire conducting clip 5, so that a conduction connection between the British standard pin assembly 2 and the power converter is achieved. When the American standard pin assembly 1 is pushed out for use, the American standard live wire conducting strip provided on the American standard shared slider 11 is inserted into the socket live wire conducting clip 4, and the American standard neutral wire conducting strip provided on the American standard shared slider 11 is inserted into the socket neutral wire conducting clip 5, so that a conduction connection between the American standard pin assembly 1 and the power converter is achieved. When the European standard pin assembly 3 is pushed out for use, the European standard live wire conducting strip 34 provided on the European standard shared slider 31 is inserted into the socket live wire conducting clip 4, and the European standard neutral wire conducting strip 35 provided on the European standard shared slider 31 is inserted into the socket neutral wire conducting clip 5, so that a conduction connection between the European standard pin assembly 3 and the power converter is achieved.

In order to further save space in the power converter, as shown in FIGS. 2 and 9-10, a European standard live wire conductive avoidance groove 41 which is upwardly bent in a shape of "ᥰ" and provides a relief for the European standard pin assembly 3 is formed on the socket live wire conducting clip 4. A European standard neutral wire avoidance groove 51 which is upwardly bent in a shape of "ᥰ" and provides a relief for the European standard pin assembly 3 is formed on the socket neutral wire conducting clip 5. A European standard live wire conductive avoidance groove 41 which provides a relief for the European standard pin assembly 3 is provided on the socket live wire conducting clip 4. Thus, the socket live wire conducting clip 4 occupies a space coinciding with the European standard pin assembly 3 while connecting different pin assemblies, reducing the overall length of the power converter, reducing the overall volume of the power converter. It is more convenient for the user to carry on the trip. The socket neutral wire conducting clip 5 is provided with a European standard neutral wire conductive avoidance groove 51 and provides a relief for the European standard pin assembly 3, so that the socket neutral wire conducting clip 5 occupies a space coinciding with the European standard pin assembly 3 while connecting different pin assemblies, reducing the overall length of the power converter, reducing the overall volume of the power converter. It is more convenient for the user to carry on the trip.

With regard to the conduction mode of the socket live wire conducting clip 4, as shown in FIGS. 9-12, the socket live wire conducting clip 4 further includes a live wire conducting clip 42 which is provided at two ends of the European standard live wire conductive avoidance groove 41 and is used for the insertion of an external plug, and the live wire conducting clip 42 may include a British standard live wire clamping portion matched with a British standard live wire pin in the external plug, an American standard live wire clamping portion matched with an American standard live wire pin in the external plug, an Australian standard or Chinese standard live wire clamping portion matched with an Australian standard or a Chinese standard live wire pin in the external plug, a European standard live wire clamping portion matched with the European standard pin in the external plug, and the live wire clamping portion matched with the live wire in the plug of different standards, so as to meet the conversion requirements of different plugs and facilitate people's travel use. The staggered arrangement of different live wire clamping portions can effectively reduce the overall space occupied and effectively reduce the overall volume of the power converter. It is more convenient for the user to carry on the trip.

With regard to the conduction mode of the socket neutral wire conducting clip 5, as shown in FIGS. 9-12, the socket neutral wire conducting clip 5 further includes a neutral wire conducting clip 52 which is arranged at two ends of the European standard neutral wire conductive avoidance groove 51 and is used for the insertion of an external plug. The neutral wire conducting clip 52 may include a British standard neutral wire clamping portion matched with a British standard neutral wire pin in the external plug, an American standard neutral wire clamping portion matched with an American standard neutral wire pin in the external plug, an Australian standard or Chinese standard neutral wire clamping portion matched with an Australian standard or a Chinese standard neutral wire pin in the external plug, a European standard neutral wire clamping portion matched with the European standard pin in the external plug, and the neutral wire clamping portion matched with the neutral wire in the plug of different standards, so as to meet the conversion requirements of different plugs and facilitate people's travel use. The staggered arrangement of different neutral wire clamping portions can effectively reduce the overall space occupied and effectively reduce the overall volume of the power converter. It is more convenient for the user to carry on the trip.

With regard to the other structural arrangements of the socket live wire conducting clip 4 and the socket neutral wire conducting clip 5, the specific structure and operation mode thereof are prior art in the art. Therefore, it is not particularly limited in the present embodiment, and can be arranged according to actual situations.

In order to improve the safety of the power converter, as shown in FIGS. 2 and 10 to 12, the pin assembly structure of the power converter further includes a safety member 6 provided in the power converter, wherein the safety member 6 communicates with the conducting structure in the power converter, so as to protect the circuit of the power converter and effectively improve the safety of the power converter.

In order to further save space in the power converter, as shown in FIGS. 3 to 6 and FIG. 12, the British standard shared slider 21 is formed with a British standard safety avoidance portion 214 which is recessed in the direction of the avoidance space 211 and yields the safety member 6, so that the space occupied by the safety member 6 coincides with the space occupied by the British standard pin assembly 2, thereby further saving the space in the power converter, reducing the overall length of the power converter and reducing the overall volume of the power converter. It is more convenient for the user to carry on the trip.

Preferably, as shown in FIGS. 3-6 and 12, the British standard safety avoidance portion 214 is inclined so that it provides more room for the safety member 6 to be installed and used.

With regard to the specific structural arrangement of the safety member 6, the safety member 6 may be a safety tube, a fuse, a fuse, etc. which may be arranged according to actual situations, and therefore is not particularly limited in the present embodiment.

Embodiment 2

As shown in FIGS. 13-24, the pin combined structure of the present power converter can also be configured to include an American standard pin assembly 1 and a British standard pin assembly 2 provided in the power converter; the British standard pin assembly 2 includes a British standard shared slider 21 slidingly provided in the power converter, and a British standard ground wire pin 22 provided on the British standard shared slider; the British standard shared slider 21 is integrally U-shaped, an avoidance space 211 is formed therein, and the British standard ground wire pin 22 is located on the outside of the avoidance space 211; and the American standard pin assembly 1 includes an American standard shared slider 11 provided in the avoidance space 211, the American standard shared slider 11 is formed with a British standard ground wire avoidance groove 111 which is inwardly recessed and matched with a British standard ground wire pin 22, and the British standard ground wire pin 22 moves along the British standard ground wire avoidance groove 111. By arranging the American standard pin assembly 1 to slide outside the avoidance space 211 and moving the British standard ground wire pin 22 along the British standard ground wire avoidance groove 111, the space occupied by the American standard pin assembly 1 and the space occupied by the British standard pin assembly 2 are partially overlapped, the overall length of the power converter is reduced, the overall volume of the power converter is reduced, and it is more convenient for the user to carry on the trip. The avoidance space 211 may also be provided for other structures within the power converter to further conserve space within the power converter.

Preferably, in order to make the power converter more practical, as shown in FIGS. 13 to 24, the pin assembly structure of the power converter further includes a European standard pin assembly 3 provided in the power converter and slidably provided in the avoidance space 211. The European standard pin assembly 3 includes a European standard shared slider 31 provided in the power converter and linearly provided in the avoidance space 211, a European standard live wire pin 32 provided on the European standard shared slider 31, and a European standard neutral wire pin 33 provided on the European standard shared slider 31. By providing a European standard pin assembly 3 in the power converter, the selectivity of the pins which can be selected for use is further improved, and the practicality of the power converter is improved, which is beneficial to people's travel. When people need to use the European standard pin assembly 3, it is only necessary to push out the European standard shared slider 31 towards the outside of the power converter. Thus, the European standard live wire pin 32 and the European standard neutral wire pin 33 are pushed out of the power converter, so as to realize the conversion of the European standard pin. The European standard pin assembly 3 moves in the avoidance space 211, so that the space occupied by the European standard pin assembly 3, the space occupied by the American standard pin assembly 1 and the space occupied by the British standard pin assembly 2 coincide, thereby reducing the overall length of the power converter and reducing the overall volume of the power converter, which is more convenient for the user to carry it on the trip.

Figure 20:
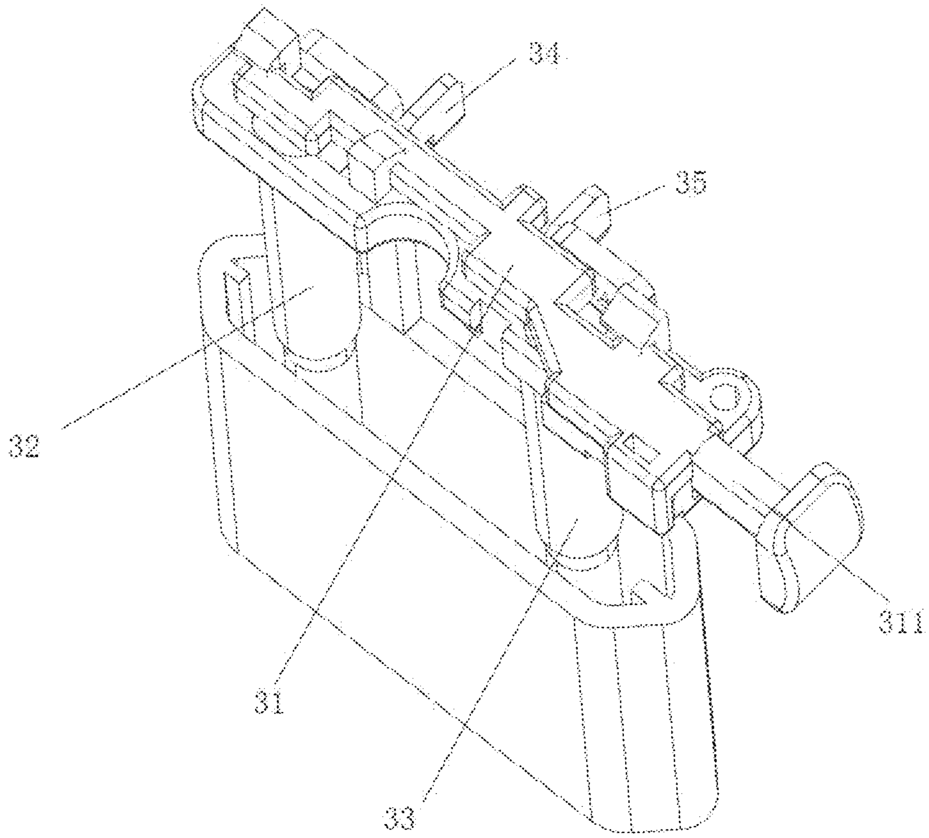
FIG. 20 is a structurally schematic view of the European standard pin assembly according to Embodiment 2.

With regard to the specific method for electrically connecting the European standard pin assembly 3 with the power converter, as shown in FIG. 20, the European standard pin assembly 3 further includes a European standard live wire conducting strip 34 provided on the European standard shared slider 31, protruding outwards and electrically connected to the European standard live wire pin 32, and a European standard neutral wire conducting strip 35 provided on the European standard shared slider 31, protruding outwards and electrically connected to the European standard neutral wire pin 33. When the European standard shared slider 31 drives the European standard live wire pin 32 and the European standard neutral wire pin 33 to be pushed out, the European standard live wire conducting strip 34 and the European standard neutral wire conducting strip 35 which are provided in the European standard shared slider 31 follow and move synchronously, so that the European live wire conducting strip 34 and the European standard neutral wire conducting strip 35 are inserted into a conduction mechanism in the power converter to realize a conduction and current connection between the European standard pin assembly 3 and the power converter. The whole process is conducted stably, and the conduction efficiency is improved.

Preferably, as shown in FIGS. 15-16, 18 and 20, in order to further save space in the power converter and facilitate the pushing out and use of the European standard pin assembly 3, the European standard shared slider 21 is formed with a European standard conducting strip avoidance groove 212 which is recessed to one end away from the avoidance space 211 and allows the European standard live wire conducting strip 34 and the European standard neutral wire conducting strip 35 to move linearly when driven by the European standard shared slider 31, and the European standard live wire conducting strip 34 and the European standard neutral wire conducting strip 35 move up and down in the European standard conducting strip avoidance groove 212. Thus, the space occupied by the European standard live wire conducting strip 34 and the European standard neutral wire conducting strip 35 coincides with the space occupied by the European standard shared slider 21, further saving the space in the power converter, reducing the overall length of the power converter, reducing the overall volume of the power converter. It is more convenient for a user to carry the product, and facilitates the pushing out and use of the European standard pin assembly 3.

Figure 18:
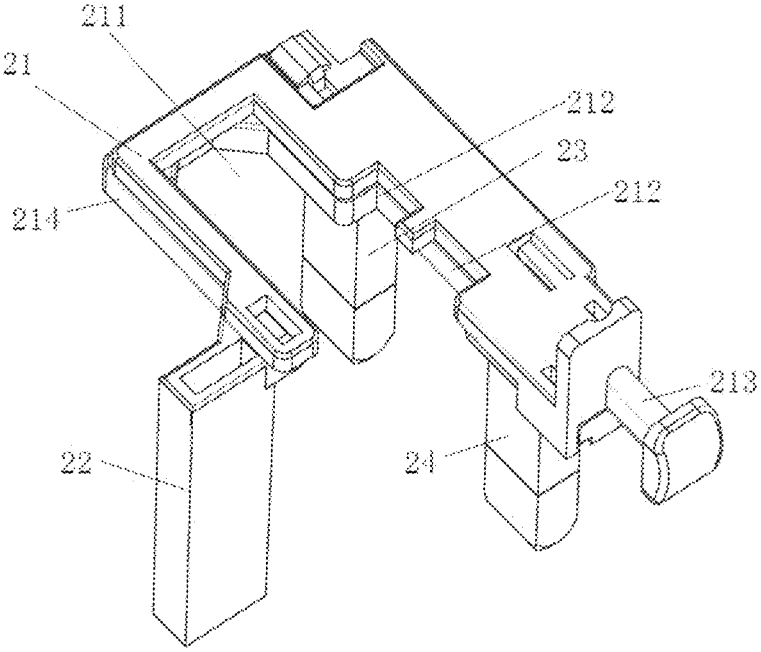
FIG. 18 is a structurally schematic view of the British standard pin assembly according to Embodiment 2.

With regard to other structural arrangements of the British standard pin assembly 2, as shown in FIG. 18, the British standard ground wire pin 22 is provided on one end of the U-shaped structure of the British standard shared slider 21; and the British standard pin assembly 2 further includes a British standard neutral wire pin 24 provided on a side of the other end of the U-shaped structure of the British standard shared slider 21, and a British standard live wire pin 23 provided on the other side of the other end of the U-shaped structure of the British standard shared slider 21.

Figure 19:
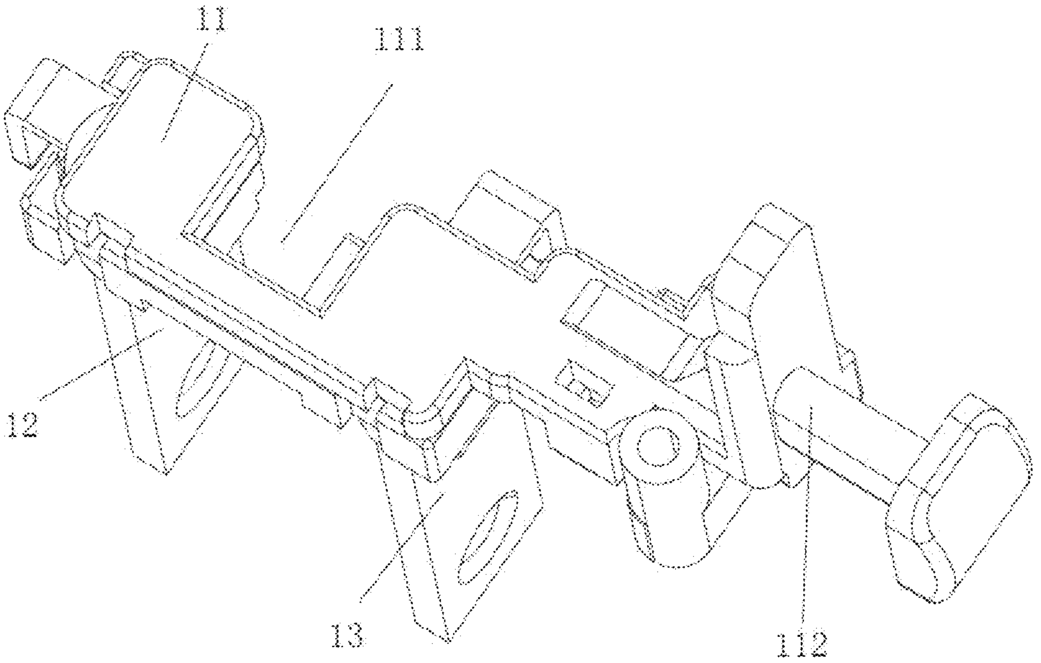
FIG. 19 is a structurally schematic view of the American standard pin assembly according to Embodiment 2.

With regard to other structural arrangements of the American standard pin assembly 1, as shown in FIG. 19, the American standard pin assembly 1 further includes an American standard live wire pin 12 provided on the American standard shared slider 11 and an American standard neutral wire pin 13 provided on the American standard shared slider 11, wherein the American standard live wire pin 12 and the American standard neutral wire pin 13 are located on both sides of the British standard ground wire pin 22, so as to make the space occupied by the American standard pin assembly 1 and the British standard pin assembly 2 coincide, reducing the overall length of the power converter, reducing the overall volume of the power converter, which is more convenient for a user to carry it on a trip.

With regard to other structural arrangements of the British standard pin assembly 2, as shown in FIG. 18, the British standard ground wire pin 22 is provided on one end of the U-shaped structure of the British standard shared slider 21; and the British standard pin assembly 2 further includes a British standard neutral wire pin 24 provided on a side of the other end of the U-shaped structure of the British standard shared slider 21, and a British standard live wire pin 23 provided on the other side of the other end of the U-shaped structure of the British standard shared slider 21.

For the specific way of pushing the American standard pin assembly 1 out of the power converter, as shown in FIG. 19, the American standard pin operating rod 112 protruding outside the power converter is provided on the American standard shared slider 11. A user pushes the American standard pin operating rod 112 to push out the American standard shared slider 11 and structures such as an American standard live wire pin 12 and an American standard ground wire pin 13 provided on the American standard shared slider 11 from the power converter, which is simple and convenient to use.

For the specific way of pushing the European standard pin assembly 3 out of the power converter, as shown in FIG. 20, the European standard pin operating rod 311 protruding outside the power converter is provided on the European standard shared slider 31. A user pushes the European standard pin operating rod 311 to push out the European standard shared slider 31 and structures such as a European standard live wire pin 32 and a European standard neutral wire pin 33 provided on the European standard shared slider 31 from the power converter, which is simple and convenient to use.

In order to allow the user to more accurately select different prong assemblies, as shown in FIG. 113, the British standard pin operating rod 213, the American standard pin operating rod 112 and the European standard pin operating rod 311 are staggered, and the staggered configuration facilitates the user's selection of different pin assemblies for use, effectively avoiding a case where a plurality of operating rods are pressed at once.

Figure 13:
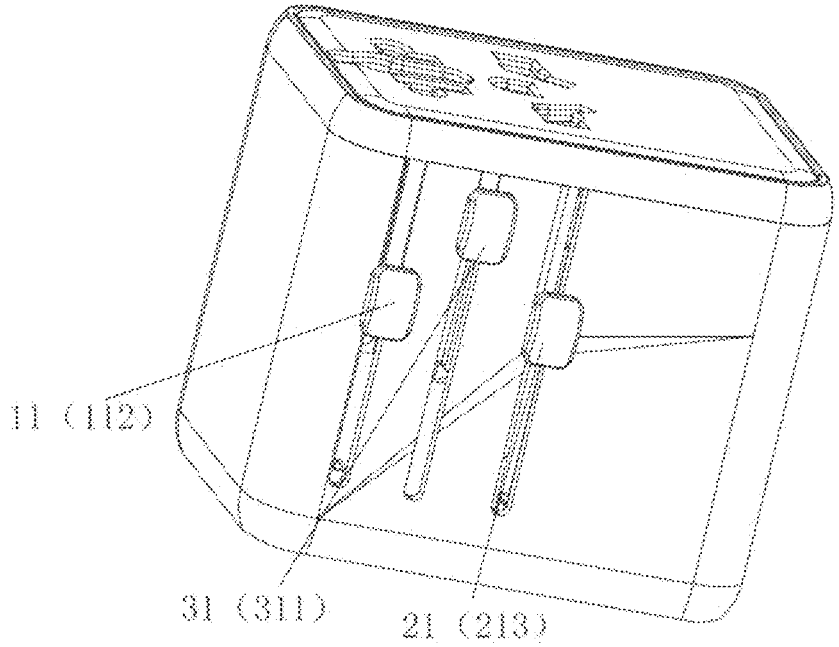
FIG. 13 is an overall schematic view of a power converter according to Embodiment 2.

Preferably, as shown in FIG. 13, the initial height of the European standard pin operating rod 311 is higher than the initial height of the British standard pin operating rod 213 and the American standard pin operating rod 112, thereby forming a staggered arrangement, effectively avoiding a case where a plurality of operating rods are pressed at once.

Figure 14:
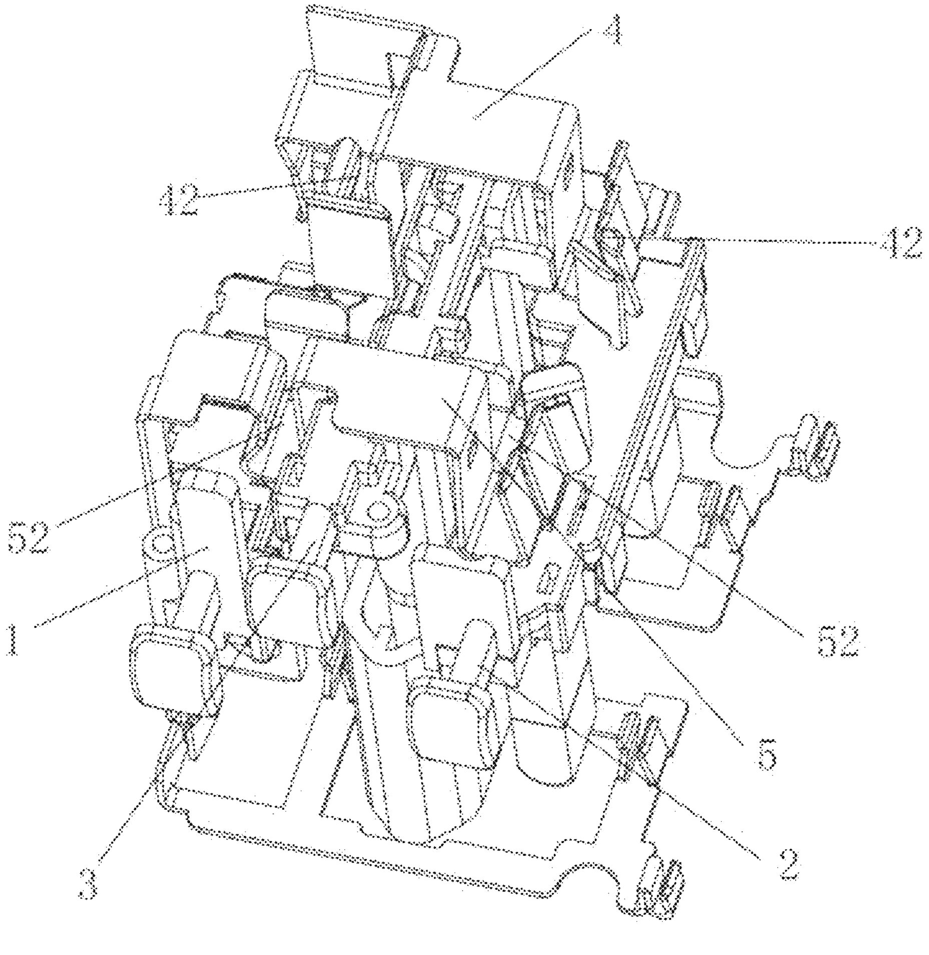
FIG. 14 is a schematic view showing the internal structure of the power converter according to Embodiment 2.
Figure 15:
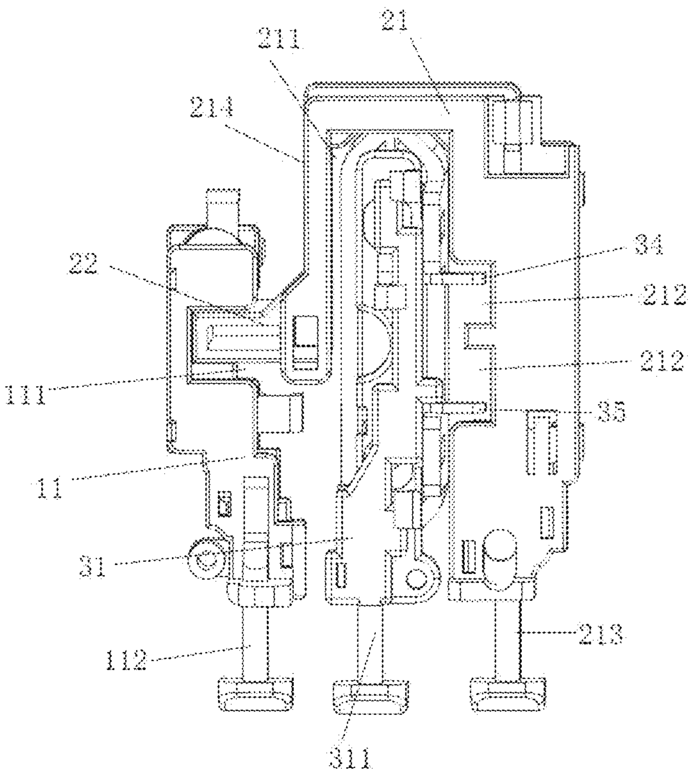
FIG. 15 is a structurally schematic view of an American standard pin assembly, a British standard pin assembly and a European standard pin assembly according to Embodiment 2.
Figure 16:
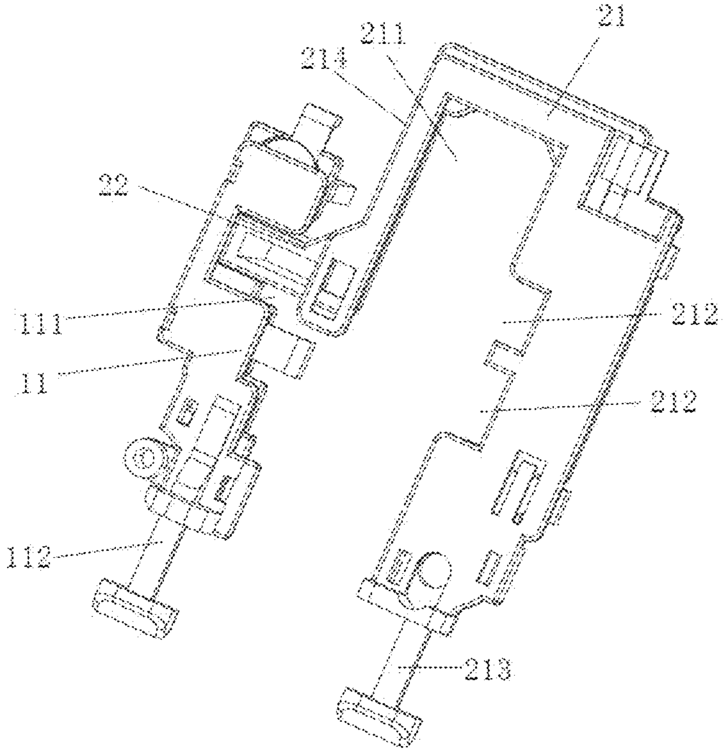
FIG. 16 is a structurally schematic view of the British standard pin assembly and the American standard pin assembly according to Embodiment 1.
Figure 17:
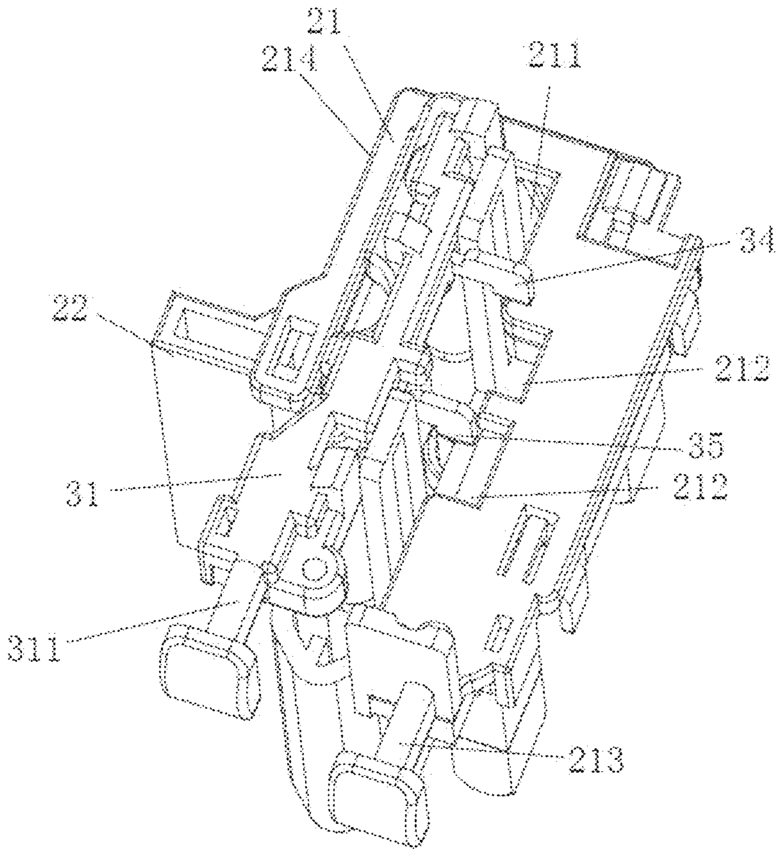
FIG. 17 is a structurally schematic view of the British standard pin assembly and the European standard pin assembly according to Embodiment 2.
Figure 21:
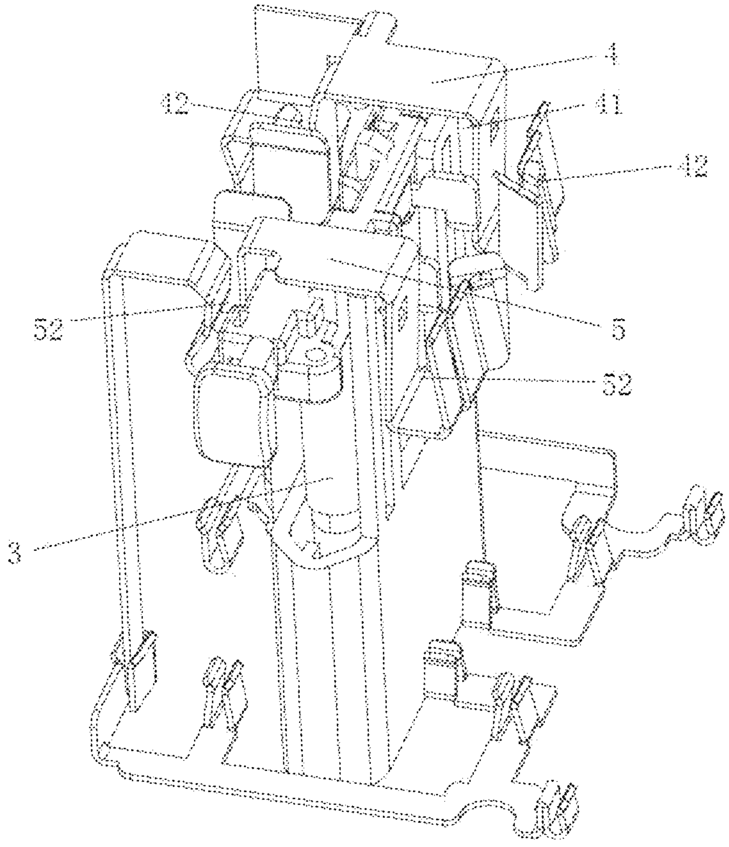
FIG. 21 is a structurally schematic view of the European standard pin assembly, a socket live wire conducting clip and a socket neutral wire conducting clip according to Embodiment 2.
Figure 22:
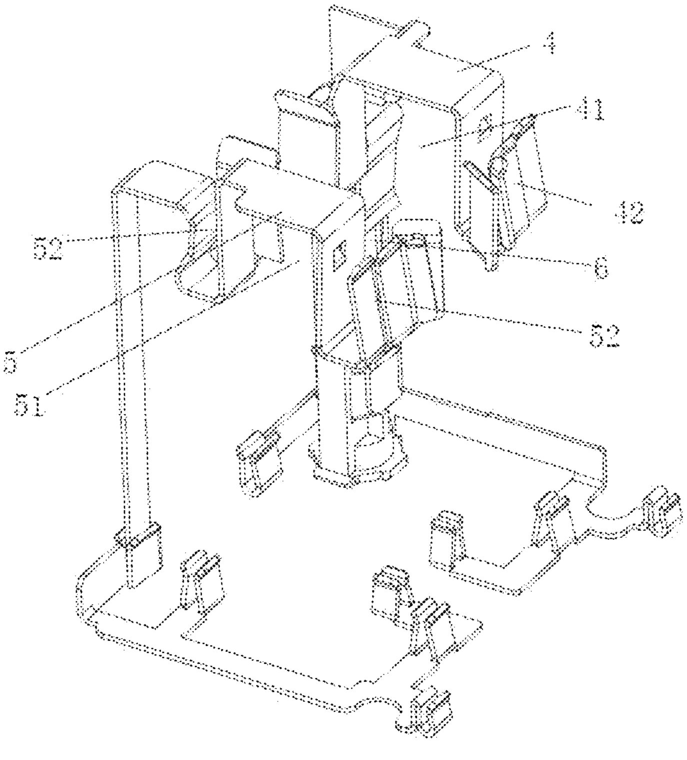
FIG. 22 is a structurally schematic view of the socket live wire conducting clip and the socket neutral wire conducting clip according to Embodiment 2.
Figure 23:
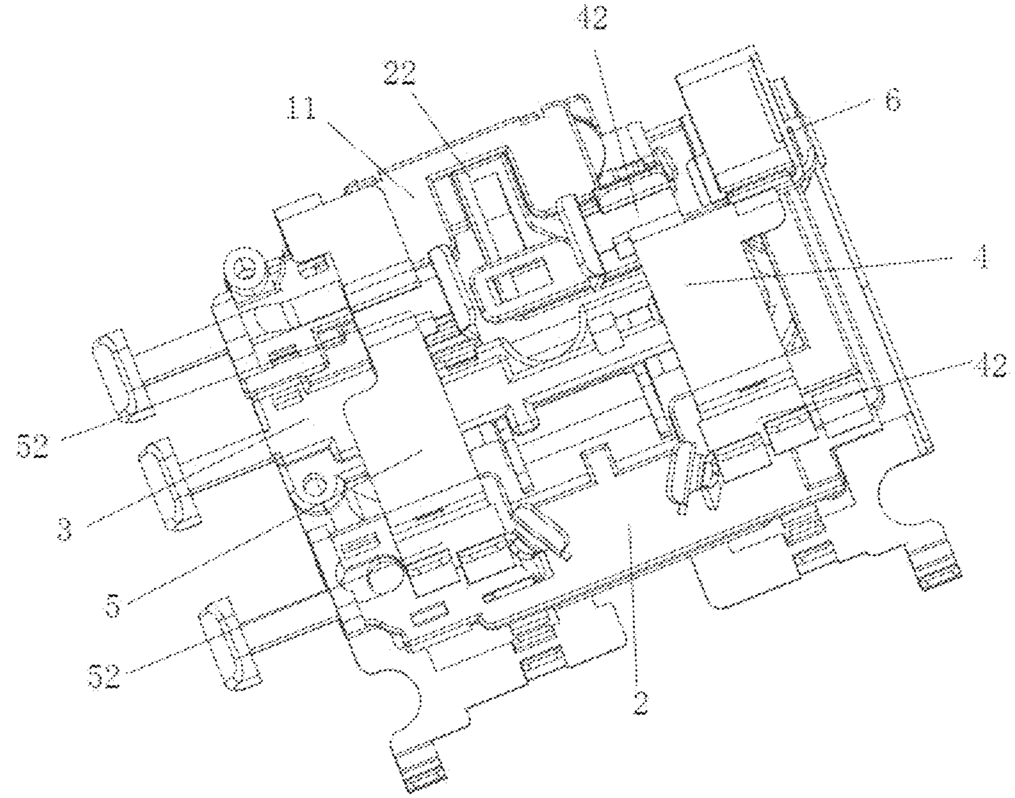
FIG. 23 is a plan view of the socket live wire conducting clip and the socket neutral wire conducting clip according to Embodiment 2.
Figure 24:
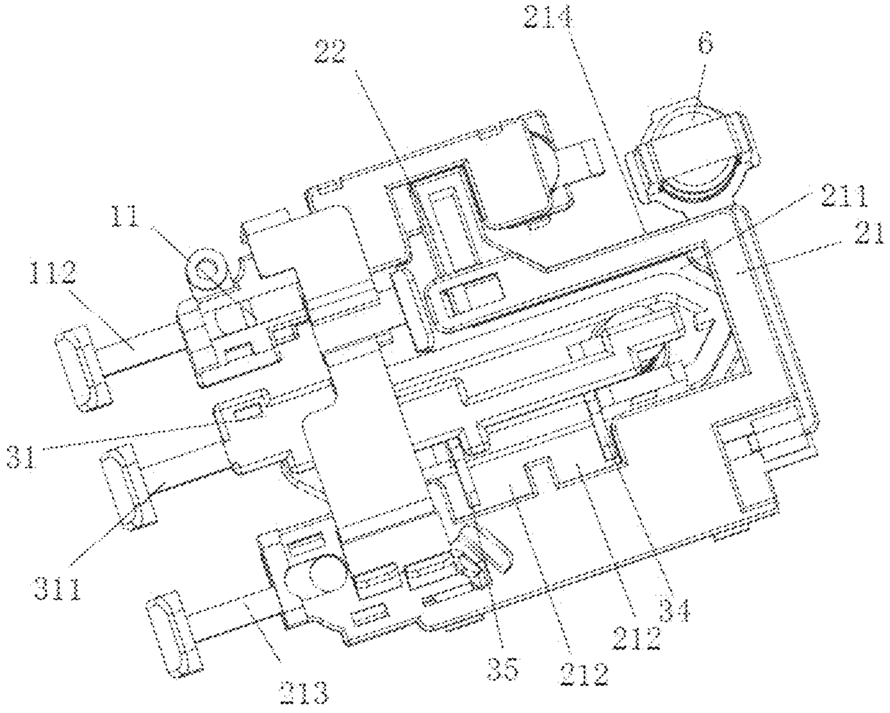
FIG. 24 is a structurally schematic view of the American standard pin assembly, the British standard pin assembly, the European standard pin assembly, and a safety member according to Embodiment 2.

With regard to the arrangement of the conducting structure in the power converter, as shown in FIGS. 14 and 21-22, the pin combined structure of the power converter further includes a socket live wire conducting clip 4 provided in the power converter and a socket neutral wire conducting clip 5 provided in the power converter. When the British standard pin assembly 2 is pushed out for use, the British standard live wire conducting strip provided on the British standard shared slider 21 is inserted into the socket live wire conducting clip 4, and the British standard neutral wire conducting strip provided on the British standard shared slider 21 is inserted into the socket neutral wire conducting clip 5, so that a conduction connection between the British standard pin assembly 2 and the power converter is achieved. When the American standard pin assembly 1 is pushed out for use, the American standard live wire conducting strip provided on the American standard shared slider 11 is inserted into the socket live wire conducting clip 4, and the American standard neutral wire conducting strip provided on the American standard shared slider 11 is inserted into the socket neutral wire conducting clip 5, so that a conduction connection between the American standard pin assembly 1 and the power converter is achieved. When the European standard pin assembly 3 is pushed out for use, the European standard live wire conducting strip 34 provided on the European standard shared slider 31 is inserted into the socket live wire conducting clip 4, and the European standard neutral wire conducting strip 35 provided on the European standard shared slider 31 is inserted into the socket neutral wire conducting clip 5, so that a conduction connection between the European standard pin assembly 3 and the power converter is achieved.

In order to further save space in the power converter, as shown in FIGS. 14 and 21-22, a European standard live wire conductive avoidance groove 41 which is upwardly bent in a shape of "ㄇ" and provides a relief for the European standard pin assembly 3 is formed on the socket live wire conducting clip 4. A European standard neutral wire avoidance groove 51 which is upwardly bent in a shape of "ㄇ" and provides a relief for the European standard pin assembly 3 is formed on the socket neutral wire conducting clip 5. A European standard live wire conductive avoidance groove 41 which provides a relief for the European standard pin assembly 3 is provided on the socket live wire conducting clip 4. Thus, the socket live wire conducting clip 4 occupies a space coinciding with the European standard pin assembly 3 while connecting different pin assemblies, reducing the overall length of the power converter, reducing the overall volume of the power converter. It is more convenient for the user to carry on the trip. The socket neutral wire conducting clip 5 is provided with a European standard neutral wire conductive avoidance groove 51 and provides a relief for the European standard pin assembly 3, so that the socket neutral wire conducting clip 5 occupies a space coinciding with the European standard pin assembly 3 while connecting different pin assemblies, reducing the overall length of the power converter, reducing the overall volume of the power converter. It is more convenient for the user to carry on the trip.

With regard to the conduction mode of the socket live wire conducting clip 4, as shown in FIGS. 21-24, the socket live wire conducting clip 4 further includes a live wire conducting clip 42 which is provided at two ends of the European standard live wire conductive avoidance groove 41 and is used for the insertion of an external plug, and the live wire conducting clip 42 may include a British standard live wire clamping portion matched with a British standard live wire pin in the external plug, an American standard live wire clamping portion matched with an American standard live wire pin in the external plug, an Australian standard or Chinese standard live wire clamping portion matched with an Australian standard or a Chinese standard live wire pin in the external plug, a European standard live wire clamping portion matched with the European standard pin in the external plug, and the live wire clamping portion matched with the live wire in the plug of different standards, so as to meet the conversion requirements of different plugs and facilitate people's travel use. The staggered arrangement of different live wire clamping portions can effectively reduce the overall space occupied and effectively reduce the overall volume of the power converter. It is more convenient for the user to carry on the trip.

With regard to the conduction mode of the socket neutral wire conducting clip 5, as shown in FIGS. 21-24, the socket neutral wire conducting clip 5 further includes a neutral wire conducting clip 52 which is arranged at two ends of the European standard neutral wire conductive avoidance groove 51 and is used for the insertion of an external plug. The neutral wire conducting clip 52 may include a British standard neutral wire clamping portion matched with a British standard neutral wire pin in the external plug, an American standard neutral wire clamping portion matched with an American standard neutral wire pin in the external plug, an Australian standard or Chinese standard neutral wire clamping portion matched with an Australian standard or a Chinese standard neutral wire pin in the external plug, a European standard neutral wire clamping portion matched with the European standard pin in the external plug, and the neutral wire clamping portion matched with the neutral wire in the plug of different standards, so as to meet the conversion requirements of different plugs and facilitate people's travel use. The different neutral wire clamps can effectively reduce the overall space occupied and effectively reduce the overall volume of the power converter. It is more convenient for the user to carry on the trip.

With regard to the other structural arrangements of the socket live wire conducting clip 4 and the socket neutral wire conducting clip 5, the specific structure and operation mode thereof are prior art in the art. Therefore, it is not particularly limited in the present embodiment, and can be arranged according to actual situations.

In order to improve the safety of the power converter, as shown in FIGS. 14 and 21 to 24, the pin assembly structure of the power converter further includes a safety member 6 provided in the power converter, wherein the safety member 6 communicates with the conducting structure in the power converter, so as to protect the circuit of the power converter and effectively improve the safety of the power converter.

In order to further save space in the power converter, as shown in FIGS. 15 to 18 and FIG. 24, the British standard shared slider 21 is formed with a British standard safety avoidance portion 214 which is recessed in the direction of the avoidance space 211 and yields the safety member 6, so that the space occupied by the safety member 6 coincides with the space occupied by the British standard pin assembly 2, thereby further saving the space in the power converter, reducing the overall length of the power converter and reducing the overall volume of the power converter. It is more convenient for the user to carry on the trip.

Preferably, as shown in FIGS. 15 to 18 and FIG. 24, the position of the British standard safety avoidance portion 214 adjacent to the American standard shared slider 11 is inclined, so that it provides space for the American standard shared slider 11, which is more convenient for pushing out and using the American standard pin assembly 1, reduces the overall length of the power converter, and reduces the overall volume of the power converter. It is more convenient for the user to carry on the trip.

With regard to the specific structural arrangement of the safety member 6, the safety member 6 may be a safety tube, a fuse, a fuse, etc. which may be arranged according to actual situations, and therefore is not particularly limited in the present embodiment.

It should be noted that the pin combined structure for the power converter the more compact volume disclosed in the present invention is an improvement to the specific structure, and it is not an innovative point of the present invention for the specific control mode. The American standard live wire pin, the American standard neutral wire pin, the British standard neutral wire pin, the British standard live wire pin, the British standard ground wire pin, the European standard live wire pin, the European standard neutral wire pin and other components involved in the present invention can be common standard components or components known to a person skilled in the art. The structure, principle and control method thereof are all known to a person skilled in the art by a technical manual or by conventional experimental methods.

The above-mentioned features are merely preferred embodiments of the present invention and do not limit the technical scope of the present invention. Therefore, other structures obtained by adopting the same or similar technical features as the above-mentioned embodiments of the present invention are all within the scope of protection of the present invention.

The invention claimed is:

1. A pin assembly structure for a power converter with a more compact volume, comprising an American standard pin assembly and a British standard pin assembly provided in the power converter, wherein the British standard pin assembly comprises a British standard shared slider slidingly provided in the power converter, and a British standard ground wire pin provided on the British standard shared slider; the British standard shared slider is integrally U-shaped, and an avoidance space is formed therein; the American standard pin assembly comprises an American standard shared slider provided in the avoidance space, the American standard shared slider is formed with a British standard ground wire avoidance groove which is inwardly recessed and matched with a British standard ground wire pin, and the British standard ground wire pin moves along the British standard ground wire avoidance groove; the pin assembly structure also comprises a European standard pin assembly provided in the avoidance space; and the European standard pin assembly comprises a European standard shared slider slidingly provided within the avoidance space, a European standard live wire pin provided on the European standard shared slider, and a European standard neutral wire pin provided on the European standard shared slider.

2. The pin assembly structure for the power converter with the more compact volume according to claim 1, wherein the European standard pin assembly further comprises a European standard live wire conducting strip provided on the European standard shared slider, protruding outwards and electrically connected to the European standard live wire pin, and a European standard neutral wire conducting strip provided on the European standard shared slider, protruding outwards and electrically connected to the European standard neutral wire pin; and the British standard shared slider is formed with an inwardly recessed European standard conducting strip avoidance groove, which allows the European standard live wire conducting strip and the European standard neutral wire conducting strip to move when driven by the European standard shared slider.

3. The pin assembly structure for the power converter with the more compact volume according to claim 1, wherein a British standard pin operating rod protruding outside the power converter is provided on the British standard shared slider; an American standard pin operating rod protruding outside the power converter is provided on the American standard shared slider; a European standard pin operating rod protruding outside the power converter is provided on the European standard shared slider; and the British standard pin operating rod, the American standard pin operating rod and the European standard pin operating rod are provided alternately.

4. The pin assembly structure for the power converter with the more compact volume according to claim 3, wherein an initial height of the European standard pin operating rod is higher than an initial height of the British standard pin operating rod and the American standard pin operating rod.

5. The pin assembly structure for the power converter with the more compact volume according to claim 1, further comprising a socket live wire conducting clip provided in the power converter and a socket neutral wire conducting clip provided in the power converter, wherein the socket live wire conducting clip is formed with a European standard live wire conductive avoidance groove which is folded upwards in a ⊓ shape and provides a yield for the European standard pin assembly; and the socket neutral wire conducting clip is formed with a European standard neutral wire conductive avoidance groove which is folded upwards in a ⊓ shape and provides a yield for the European standard pin assembly.

6. The pin assembly structure for the power converter with the more compact volume according to claim 5, wherein the socket live wire conducting clip further comprises a live wire conduction clip provided at both ends of the European standard live wire conductive avoidance groove and for insertion of an external plug; and the socket neutral wire conducting clip further comprises a neutral wire conduction clip provided at both ends of the European standard neutral wire conductive avoidance groove and for insertion of a second external plug.

7. The pin assembly structure for the power converter with the more compact volume according to claim 1, further comprising a safety member provided in the power converter; wherein a British standard safety avoidance portion that is recessed in an avoidance space direction and that yields the safety member is formed on the British standard shared slider.

8. A pin assembly structure for a power converter with a more compact volume, comprising an American standard pin assembly and a British standard pin assembly provided in the power converter, wherein the British standard pin assembly comprises a British standard shared slider slidingly provided in the power converter, and a British standard ground wire pin provided on the British standard shared slider; the British standard shared slider is integrally U-shaped, an avoidance space is formed therein, and the British standard ground wire pin is located on an outside of the avoidance space; the American standard pin assembly comprises an American standard shared slider provided in the avoidance space, the American standard shared slider is formed with a British standard ground wire avoidance groove which is inwardly recessed and matched with a British standard ground wire pin, and the British standard ground wire pin moves along the British standard ground wire avoidance groove; the pin assembly structure also comprises a European standard pin assembly provided in the avoidance space; and the European standard pin assembly comprises a European standard shared slider slidingly provided within the avoidance space, a European standard live wire pin provided on the European standard shared slider, and a European standard neutral wire pin provided on the European standard shared slider.

9. The pin assembly structure for the power converter with the more compact volume according to claim 8, wherein the European standard pin assembly further comprises a European standard live wire conducting strip provided on the European standard shared slider, protruding outwards and electrically connected to the European standard live wire pin, and a European standard neutral wire conducting strip provided on the European standard shared slider, protruding outwards and electrically connected to the European standard neutral wire pin; and the British standard shared slider is formed with an inwardly recessed European standard conducting strip avoidance groove, which allows the European standard live wire conducting strip and the European standard neutral wire conducting strip to move when driven by the European standard shared slider.

10. The pin assembly structure for the power converter with the more compact volume according to claim 8, wherein a British standard pin operating rod protruding outside the power converter is provided on the British standard shared slider; an American standard pin operating rod protruding outside the power converter is provided on the American standard shared slider; a European standard pin operating rod protruding outside the power converter is provided on the European standard shared slider; and the British standard pin operating rod, the American standard pin operating rod and the European standard pin operating rod are provided alternately.

11. The pin assembly structure for the power converter with the more compact volume according to claim 10, wherein an initial height of the European standard pin operating rod is higher than an initial height of the British standard pin operating rod and the American standard pin operating rod.

12. The pin assembly structure for the power converter with the more compact volume according to claim 8, further comprising a socket live wire conducting clip provided in the power converter and a socket neutral wire conducting clip provided in the power converter, wherein the socket live wire conducting clip is formed with a European standard live wire conductive avoidance groove which is folded upwards in a ㄇ shape and provides a yield for the European standard pin assembly; and the socket neutral wire conducting clip is formed with a European standard neutral wire conductive avoidance groove which is folded upwards in a ㄇ shape and provides a yield for the European standard pin assembly.

13. The pin assembly structure for the power converter with the more compact volume according to claim 12, wherein the socket live wire conducting clip further comprises a live wire conduction clip provided at both ends of the European standard live wire conductive avoidance groove and for insertion of an external plug; and the socket neutral wire conducting clip further comprises a neutral wire conduction clip provided at both ends of the European standard neutral wire conductive avoidance groove and for insertion of a second external plug.

14. The pin assembly structure for the power converter with the more compact volume according to claim 8, further comprising a safety member provided in the power converter; wherein a British standard safety avoidance portion that is recessed in an avoidance space direction and that yields the safety member is formed on the British standard shared slider.

* * * * *